3,341,499
POLYURETHANES CURED WITH GUANAMINES
Donald W. Kaiser, Hamden, Conn., assignor to Olin Mathieson Chemical Corporation, a corporation of Virginia
No Drawing. Filed Oct. 11, 1963, Ser. No. 315,683
8 Claims. (Cl. 260—75)

This invention relates to a curing process for polymeric materials. More particularly this invention relates to a process for curing polyurethane polymers and epoxy resins with guanamines and to the products produced thereby.

A curing agent may be defined as any material which has the ability to transform a polymeric material from the liquid to a hard, resinous solid. This hardening process is accomplished by the addition of a material, which is chemically active, known as a curing agent. Some curing agents act on the polymeric elastomers in a catalytic manner while with other materials, such as the guanamines of this invention, a direct participation in the reaction takes place and such curing agents become a part of the resin chain.

Numerous curing agents have been utilized heretofore in the preparation of solid polyurethane polymers and solid epoxy resins, however, all of these materials suffer from one or more disadvantages.

Among the amine-type curing agents previously suggested for use in preparing solid polyurethanes a number are extremely fast acting and as a result the resin with the admixed catalyst must be used almost immediately and any unused material must be removed from the mixing vessel and discarded to pervent solidification within the vessel. In addition, many of the amine-type compound which have been utilized in the prior art processes cause dermatitis, are toxic and many possess extremely unpleasant odors. A number of the previously proposed amines have rather high melting points and since they must be mixed with the uncured resins at elevated temperatures so that complete solution is obtained, in plant handling problems are considerable. With such material, it is frequently found that on subsequent cooling the curing agent precipitates thus resulting in the formation of off-grade products.

The guanamine compounds of this invention offer many advantages over the conventional curing agents now employed in the industry. Products prepared using these guanamines have good resin color, improved clarity, they have a soft and warm feel (somewhat like skin texture), they exhibit a low temperature modulus, they have good color stability with U.V. absorbers, long pot life, the curing time is long enough to permit reshaping during the manufacturing process, and they are easily dyed and pigmented. In addition, products which are essentially colorless can be conventiently prepared with the guanamine curing agents of this invention.

Solid polyurethane polymers can be prepared by the prepolymer method, or by a direct one-step method. The novel curing agents of this invention are useful in practicing both methods for the preparation of solid polyurethane polymers.

In the prepolymer method, for example, 1 mole of a polyoxyalkylene diol is reacted with slightly more than 2 moles of a diisocyanate, to form an isocyanate-terminated liquid prepolymer. In the next step, the liquid prepolymer is reacted further, or cured, with a guanamine compound or with a mixture of a guanamine compound and a triol or other suitable curing material, into the solid polyurethane polymer. In the reaction with a guanamine a calculated excess of prepolymer (excess isocyanate) reacts with the guanamine (the curing agent) in a chain extension reaction to form long linear chains containing the resulting urea linkages. The excess isocyanate reacts further with the residual amide hydrogen (now urea hydrogen) to form biuret crosslinks, and a solid product.

In the triol cure, an equivalent amount of prepolymer (excess isocyanate) is reacted with a triol to produce a three-dimensional network and cured product. The guanamine curing agent is selected to provide the desired combination of cure rate and final properties desired. The triol cure may be accelerated by the addition of tin or tertiary amine catalysts.

In preparing solid polyurethane polymers of this invention by the one-step method a diisocyanate is reacted directly with a guanamine compound polyether polyol, which can be, for example, a polyoxyalkylene diol or triol, or a blend of one or more diols or of one or more triols or a blend of a diol or triol.

In place of the polyether polyol a hydroxyl-substituted polyester can be employed.

In the process of this invention cured polyurethane polymers are prepared by heating together at an elevated temperature a urethane prepolymer and a guanamine compound. With ureathane polymers prepared by the one-step method, the guanamine compound and the other reactants, are mixed together and then heated at an elevated temperature. Epoxy resins can be cured in the same manner as the polyurethane prepolymers, i.e. by heating the epoxy resin and the guanamine curing compound together at an elevated temperature.

Guanamine compounds useful in the process of this invention include caproguanamine, pelargonoguanamine, lauroguanamine, stearoguanamine, oleoguanamine, and 2-ethylhexanoguanamine. The guanamines useful in this invention as curing agents or elastomer compositions include those which melt at a temperature less than about 120° C. and preferably those which melt between about 90° C. and about 120° C. A number of suitable processes are known in the art for the preparation of guanamines of this type, for example, lauroguanamine can be prepared by reacting biguanide dissolved in ethanol with methyl laurate in the presence of sodium hydroxide (see U.S. Patent 2,344,784).

In preparing the novel products of this invention any of a wide variety of polyisocyanates can be employed. The polyisocyanates can be utilized alone, as isomer mixtures, or mixtures of one or more of the various polyisocyanates. In addition, aromatic, aliphatic and cycloaliphatic diisocyanates and mixtures of these materials are also useful. Arylene diisocyanate that is, those diisocyanates in which the two isocyanate groups are attached directly to an aromatic ring, are preferred.

Suitable polyisocyanate compounds for the process of this invention include: 2,4-tolylene diisocyante, 2,6-tolylene diisocyanate, 1,4 - tetramethylenediisocyanate, 1,6-hexamethylenediisocyanate, 1,10 - decamethylenediisocyanate, 1,5-naphthalenediisocyanate, cumene - 2,4 - diisocyanate, 4-methoxy-1,3-phenylenediisocyanate, 4-chloro-1,3-phenylenediisocyanate, 4-bromo - 1,3 - phenylenediisocyanate, 4-ethoxy-1,3-phenylenediisocyanate, 2,4' - diisocyanatodiphenylether, 5,6'-dimethyl - 1,3 - phenylenediisocyanate, 2,4-dimethyl-1,3-phenylenediisocyanate, 4,4' - diisocyanatodiphenylether, benzidinediisocyanate, 4,6 - dimethyl - 1,3 - phenylenediisocyanate, 9,10 - anthracenediisocyanate, 4,4'-diisocyanatodibenzyl, 3,3' - dimethyl-4,4' - diisocyanatodiphenylmethane, 2,6 - dimethyl-4,4'-diisocyanatodiphenyl, 2,4 - diisocyanatostilbene, 3,3' - dimethyl-4,4'-diisocyanatodiphenyl, 3,3' - dimethoxy - 4,4'-diisocyanatodiphenyl, 1,4 - anthracenediisocyanate, 2,5-fluorenediisocyanate, 1,8 - naphthalenediisocyanate, 1,3-phenylene - diisocyanate, methylene bis(4-phenylisocyanate), 2,6-diisocyanatobenzfuran, 2,4,6 - toluenetriisocyanate, 2,4,4'-triisocyanatodiphenylether, etc. Mixtures of isomers of the various polyisocyanates are also useful.

In preparing the polyurethane compositions of this invention polyether polyol reactants having a number average molecular weight of between 400 and about 10,000 are useful. Useful polyether polyols are polyalkyleneether glycols, polyalklyenearylene glycols, polyalkyleneether-thioether glycols and polyalkylenearylether-thioether glycols, as well as polyalkyleneether triols. The preferred glycol in practicing the process of this invention is a polyalkyleneether glycol. If desired, mixtures of the various polyols may be employed.

The polyalkyleneether glycols (polyalkylene glycols) can be represented by the formula $HO(RO)_nH$ where R is an alkylene group which need not necessarily be the same in each instance and $n$ is an integer. Glycols useful as starting materials include polyethylene glycol, polypropylene glycol, polytrimethylene glycol, polytetramethylene glycol, polypentamethylene glycol, polydecamethylene glycol, polytetramethyleneformal glycol, poly-1,2-dimethylethylene glycol, etc.

Polyalkyleneether triols (polyalkylene triols) useful in the process of this invention can be manufactured by reacting one or more alkylene oxides with one of more low molecular weight aliphatic triols. Examples of suitable oxides include, for example, ethylene oxide; propylene oxide; 1,2-epoxybutane; 1,2-epoxyhexane; 1,2-epoxyoctane; 1,2-epoxyhexadecane; 2,3-epoxybutane; 3,4-epoxyhexane; 1,2-epoxy-5-hexene; and 1,2-epoxy-3-butene. The preferred oxides are ethylene, propylene and butylene oxides. In addition to mixtures of these oxides, minor proportions of other alkylene oxides having cyclic substituents such as styrene oxide, cyclohexene oxide, 1,2-epoxy-2-cyclohexylpropane, and α-methyl styrene oxide can be use. Triols found to be satisfactory include glycerol; 1,2,6-hexanetriol; 1,1,1-trimethylolpropane; 1,1,1-trimethylolethane; 2,4-dimethyl-2-methylolpentanediol-1,5 the trimethylether of sorbitol, etc. Examples of the polyalkyleneether triols include; polypropylene ether triol (M.W. 700) made by reacting 608 parts of 1,2-propyleneoxide with 92 parts of glycerine; polypropyleneether triol (M.W. 1535) made by reacting 1401 parts of 1,2-propyleneoxide with 134 parts of trimethylolpropane; polypropyleneether triol (M.W. 2500) made by reacting 2366 parts of 1,2-propyleneoxide with 134 parts of 1,2,6-hexanetriol; and polypropyleneether triol (M.W. 6000) made by reacting 5866 parts of 1,2-propyleneoxide with 134 parts of 1,2,6-hexanetriol.

The polyalkylene-aryleneether glycols are similar to the polyalkyleneether glycols (polyalkylene glycols) except that arylene radicals such as phenylene, naphthalene and anthracene radicals which may be substituted with various substituents, such as alkyl groups, are present. In general, in these glycols there should be at least one alkyleneether radical having a molecular weight of about 500 for each arylene radical which is present. The polyalkyleneether-thioether glycols and the polyalkylenearyleneether glycols are similar to the above-described polyether glycols except that a part of the ether-oxygen atoms are replaced by sulfur atoms. Such glycols can be prepared by condensing together various glycols, such as thiodiglycols, in the presence of p-toluene-sulfonic acid or other suitable catalyst.

Aliphatic polyols which can be employed in minor amounts with the polyether polyols previously described in preparing the novel polyurethane polymers of this invention include: ethylene glycol; propylene glycol; trimethylene glycol; 1,2-butylene glycol; 1,3-butanediol; 1,4-butanediol; 1,5-pentanediol; 1,2-hexylene glycol; 1,10-decanediol; 1,2-cyclohexanediol; 2-butene-1,4-diol; 3-cyclohexene-1,1-dimethanol; 4-methyl-3-cyclohexene-1,1-dimethanol, 3-methylene-1,5-pentanediol, etc. Other examples of aliphatic polyols include alkylene oxide modified diols such as: diethylene glycol; (2-hydroxyethoxy)-1-propanol; 4-(2-hydroxyethoxy)-1-butanol; 5-(2-hydroxyethoxy)-1-pentanol; 3-(2-hydroxypropoxy)-1-propanol; 4-(2-hydroxypropoxy)-1-butanol; 5-(2-hydroxypropoxy)-1-pentanol; 1-(2-hydroxyethoxy)-2-butanol; 1-(2-hydroxyethoxy)-2-pentanol; 1-(2-hydroxypropoxy)-2-butanol; 1-(2-hydroxypropoxy)-2-propanol; 1-(2-hydroxypropoxy)-2-hexanol, 1-(2-hydroxypropoxy)-2-octanol, etc. Representative examples of ethylenically unsaturated low molecular weight diols which can also be utilized in minor amounts with the polyether polyols include: 3-allyloxy-1,5-pentanediol; 3-allyloxy-1,2-propanediol; 2-allyloxy-methyl-2-methyl-1,3-propanediol; 2-methyl-2-[(4-pentenyloxy)methyl]-1,3-propanediol; and 3-(o-propenylphenoxy)-1,2-propanediol; others are listed in U.S. 2,927,098, 2,854,486.

Low molecular weight polyols having at least 3 hydroxyl groups can, in a like manner, be employed in small amounts along with the polyether polyols in preparing the novel polyurethane polymers of this invention. Examples of such materials include: glycerol, 1,2,6-hexanetriol; 1,1,1-trimethylolpropane; 1,1,1-trimethylolethane; pentaerythritol; 3-(2-hydroxyethoxy)-1,2-propanediol; 3-(2-hydroxypropoxy)-1,2-hexanediol; 2,4-dimethyl-2-(2-hydroxyethoxy) methylpentanediol-1,5; mannitol; galactitol; talitol; iditol; allitol; altritol; gulitol; arabitol; ribitol; xylitol; lyxitol; erythritol; threitol; 1,2,5,6-tetrahydroxyhexane; meso-inositol; sucrose; glucose; galactose; mannose; fructose; xylose; arabinose; dihydroxyacetone; glucose - α - methylglucoside; 1,1,1-tris[(2-hydroxyethoxy) methyl]ethane and 1,1,1 - tris [(2 - hydroxypropoxy) methyl]propane, etc.

In the process of this invention it is desirable to maintain homogeneity with the reactants from the time when they are mixed to the time when they have completely reacted to form the final cured polymer. Generally, when the polyurethanes are prepared by the simultaneous mixing of all of the reactants (including the guanamine curing agent), temperatures of from about 80° C. to about 190° C. can be employed over a reaction time ranging from about 0.5 hour to about 30 hours or more. Preferably the reaction temperature will be maintained between about 90° C. and 120° C. while the reaction time ranges from about 10 to 30 hours. This is the so-called one step process for the preparation of polyurethane materials. When a fluid isocyanate-terminated polyurethane (polyurethane prepolymer) prepared, for example, by reacting an excess of an organic isocyanate with a polyether polyol is cured by the process of this invention the guanamine curing agent is added to the fluid isocyanate-terminated polyurethane and the resulting admixture is then heated to a temperature of about 80° C. to about 190° C. over a reaction time ranging from about 0.5 hour to about 30 hours. The preferred reaction time is from about 10 to about 24 hours and the preferred reaction temperature is about 90° C. to about 120° C. In the one-step process after all the reactants have been mixed either after having been heated to about 115° C., for example, or at room temperature and either simultaneously or sequentially, it is generally desirable to heat the mixture at temperatures of from about 60° C. to about 190° C. and at a pressure of from about 0.01 to about 10 mm. Hg to remove entrapped gases. In addition, the liquid reactants employed in preparing the novel cured polymeric positions of this invention can be degassed, if desired, by heating to temperatures of from about 60° to about 120° C. under vacuum before the individual ingredients are added to the reactor. During the reaction agitation is normally used to provide thorough mixing of the reactants and to aid in the control of the reaction temperature. In working with prepolymers it has been found that compositions with improved properties, that is end products with improved properties can be obtained by vacuum stripping the excess free polyisocyanate from the polymer preparation.

The quantity of guanamine compound utilized in preparing cured polyurethane polymers can be varied widely from about 5 to about 60 parts by weight per 100 parts by weight of polyurethane prepolymer or per 100 parts by weight of the polyisocyanate and the polyether polyol employed in preparing polyurethane polymers by the one-step method. Preferably, from about 5 to about 45 parts by weight of guaramine are used per 100 parts by weight of the polyurethane prepolymer or per 100 parts by weight of the polyisocyanate and the polyether polyol employed in preparing polyurethane polymers by the one-step method.

Also included in the polyurethane type products which may be cured according to this invention are those prepared from a high molecular weight, substantially linear polyester, and an organic diisocyanate. In U.S. Patents 2,621,166, 2,625,531 and 2,625,532 the preparation of products of this type is described. To be useful the polyesters must have a molecular weight of at least 500 and are prepared by reacting together glycols such as ethylene glycol, 1,2-propylene glycol, 2,3-butylene glycol, and 1,6-hexylene glycol, and dicarboxylic acid such as adipic, pimelic, sebacic, oxalic and phthalic acids and decamethylene dicarboxylic acid. The polyesters may be represented by the formula $HO[R \cdot OOC \cdot R' \cdot COO]_n ROH$, in which R and R' are hydrocarbon radicals derived from the glycol and dicarboxylic acid respectively and $n$ is an integer large enough that the molecular weight of the compound is from 500 to about 5000 and that the polyester group $-[R \cdot OOC \cdot R' \cdot COO]_n \cdot RO-$ has the formula weight of at least 480. A useful material is the polyester formed by reacting adipic acid with a mixture of ethylene and propylene glycols. In the preparation of these polyesters, the glycol is used in at least slight excess so that the polyesters contain terminal hydroxyl groups which are available for reaction with the isocyanates. The same diisocyanates, and reaction conditions useful in preparing polyurethane polymers from the polyalkylene glycols are also useful with the polyesters. In carrying out the process of this invention to make cured polyester-type polyurethane polymers prepared from polyesters and diisocyanates from about 5 to about 60 parts by weight of the guanamine compound per 100 parts by weight of the polyester-type polyurethane polymer is used and preferably from about 5 to about 45 parts by weight of the guanamine per 100 parts of the starting polymer are employed.

In preparing the novel polyurethane polymers of this invention, the proportions of reactants are selected to provided from about 0.75 to 1.1 —NCO groups for each —OH group and about 0.5 to 1.1 additional —NCO group for each —NH$_2$. Generally the overall value of the molar ratio of —NCO groups to the sum of the —OH groups and —NH$_2$ groups will range between about 0.65:1.0 and 1.1:1.

In the novel polyurethane polymers of this invention from about 50 to about 85 percent by weight of the cured polymer will be derived from the polyether polyol while preferably from about 60 to about 85 percent by weight of the cured polymer will be from the polyether polyol. Generally from about 4 to about 40 percent by weight of the cured polymer will be derived from the guanamine compound. Values ranging from about 4 to about 25 percent are preferred.

One of the problems associated with polyurethane prepolymers known in the art is that the curing agent employed must be added only a short time, from a few minutes, to a few hours, before casting or molding the mixture into a solid elastomer. Otherwise the prepolymer-curing agent mixture of the type-mentioned gels after a short period (called pot-life) and the material cannot be cast or molded into a satisfactory elastomer. The reason for the limited pot-life of the polyurethane prepolymer-curing agent mixture known to the art at ambient temperatures up to elevated temperatures is readily understood by following the disappearance of isocyanate groups by infrared spectroscopy. For example IR scanning of a mixture of polypropylene glycol-tolylene diisocyanate prepolymer and methylene bis(3-chloro, 4-amino benzene) at 25° C., shows that in 72 hours, all the isocyanate groups have disappeared, and the mixture is a completely reacted elastomer. If this elastomer were cast into sheet or film, it exhibits good mechanical properties indicating the completeness of cure.

It has been found that the novel curing agents of this invention can be mixed with a polyurethane prepolymer and be stored at room temperatures without the risk of cure. When desired the mixture of prepolymer and the novel curing agents be heated to around 100° C., cast in a suitable mold and cured at about 80°–190° C. for periods of 30 minutes to 24 hours. At the end of this period the cured elastomer possesses good mechanical properties. The uncured mixture of the prepolymer and the novel curing agents does not have mechanical properties of practical importance. When a sample of the mixture of a prepolymer and a guanamine-type curing agent of this invention is examined by infrared spectroscopy, the height of NCO absorption peak does not change (at room temperature) over a period of more than a month indicating that the NCO group of the prepolymer and NH$_2$ group of the guanamine do not react with each other at room temperature. When the mixture is heated to elevated temperatures of 100° C. or over for a period of 30 minutes to 24 hours, gradual disappearance of NCO infrared absorption peak takes place and the prepolymer is completely chain-extended or in other words, is cured. The cured elastomer has good mechanical properties. The novel curing agents enable one to prepare any size batter of prepolymer and curing agent mixture, store the mixture safely as a one package system and cast, mold or extrude it when desired. It is highly convenient for transportation from one point to another and manufacture of elastomer parts at convenience. No metering and mixing of the prepolymer and curing agent is necessary at the time of casting. Since one large batter can be made and used when desired, it eliminates errors arising out of weighing small quantities of the ingredients and mixing afresh.

Epoxy resins also known as glycidyl polyethers can likewise be cured by the process of this invention. In curing the epoxy resins with a guanamine curing agent the same procedure is used as for curing the polyurethane prepolymers. The guanamine curing agent can conveniently be melted and then added to the heated epoxy resin and the resulting admixture slowly heated with stirring to temperatures of from about 80° C. to about 190° C. Generally, the curing time will vary from about 0.5 hour to about 30 hours or more and preferably will be about 3 to about 10 hours depending upon the particular reaction conditions employed. If desired, the reactants themselves may be degassed and the reaction mixture after all of the ingredients have been added can also be subject to reduced pressure in order to remove entrapped gases. The quantity guanamine curing agents required to form the desired cured epoxy type resin can be varied widely from about 5 to about 60 parts by weight of the guanamine compound per 100 parts by weight of the starting epoxy resin and preferably will be from about 5 to about 20 parts by weight per 100 parts by weight of the starting resin.

Suitable epoxy resins for use in the process of this invention may be obtained by reacting predetermined amounts of at least 1 polyhydric phenol or polyhydric alcohol and at least one epihalohydrin in an alkaline medium. Phenols which are suitable for use in preparing such resinous polymeric epoxides include those which contain at least two phenolic hydroxy groups per molecule. Particularly suitable are the polynuclear phenols wherein the phenol nuclei are joined by carbon bridges, such as 4,4'-dihydroxy-diphenyl-dimethyl-methane (referred to hereinafter as Bisphenol A), 4,4'-dihydroxy-diphenyl-methyl-methane and 4,4'-dihydroxy-diphenyl-methane, etc. Polynuclear phenols wherein the phenol nuclei are joined by sulfur bridges, such for example as 4,4'-dihydroxy-diphenyl-sulfone can be employed in admixture with the polynuclear phenols mentioned previously. Examples of suitable polyhydric alcohols are glycerol, propylene glycol and 1,5-pentanediol.

Although epichlorohydrin is the preferred epihalohydrin in the preparation of the resinous polymeric epoxide starting materials of the present invention, if desired epibromohydrin and the like also may be used.

In the preparation of the resinous polymeric epoxides, aqueous alkali is employed to combine with the halogen of the epihalohydrin reactant. The amount of alkali employed should be substantially equivalent to the amount of halogen present and preferably should be employed in an amount somewhat in excess thereof. Potassium hydroxide and lithium hydroxide as well as mixtures of the alkali metal hydroxides can be employed although it is preferred to use sodium hydroxide since it is inexpensive.

Instead of being a single simple compound, the product is generally a complex mixture of glycidyl polyethers, in which the principal product may be represented by the formula:

where $n$ is an integer of the series 0, 1, 2, 3 . . ., and R represents the divalent hydrocarbon radical of the dihydric phenol. While for any single molecule of the polyether $n$ is an integer, since the obtained polyether is a mixture of compounds, the determined value for $n$, from molecular weight measurement, is an average which is not necessarily zero or a whole number. The polyether, although primarily a substance of the above formula, may contain some material with one or both of the terminal glycidyl radicals in hydrated form.

The simplest polyether is a diglycidyl diether of the dihydric phenol which contains a single divalent aromatic hydrocarbon radical from the dihydric phenol and has two glycidyl radicals linked thereto by ethereal oxygen atoms. More generally, the polyether is of more complex character and contains two or more aromatic hydrocarbon radicals alternating with glyceryl groups in a chain which are linked together by intervening ethereal oxygen atoms.

The resinous polymeric epoxide, or glycidyl polyether of a dihydric phenol useful in this invention, has a 1,2-epoxy equivalency greater than 1.0. By epoxy equivalency reference is meant to the average number of 1,2-epoxy groups

contained in the average molecule of the glycidyl ether. Due to the method of preparation of the glycidyl polyethers and the fact that they are ordinarily a mixture of chemical compounds having somewhat different molecular weights and contain some compounds wherein the terminal glycidyl radicals are in hydrated form, the epoxy equivalency of the product is not necessarily the integer 2.0. In all cases it is a value greater than 1.0. The 1,2-epoxy equivalency of the polyethers is thus a value between 1.0 and 2.0.

To determine the 1,2-epoxide value of the glycidyl polyether a weighed sample of the ether is heated with an excess of 0.2 N pyridinium chloride in chloroform solution at the boiling point under reflux for 2 hours whereby the pyridinium chloride hydrochlorinates the epoxy groups to chlorohydrin groups. After cooling, the excess pyridinium chloride is back-titrated with 0.1 N sodium hydroxide in methanol to the phenolphthalein end point.

Glydicyl polyethers and epoxy resins suitable for use in the process of this invention can be made by admixing and reacting from one to two mol proportions of epihalohydrin, preferably epichlorohydrin, with about one mol proportion of Bisphenol A in the presence of at least a stoichiometric excess of alkali based on the amount of halogen.

In preparing the resinous polymeric epoxides, aqueous alkali, Bisphenol A and epichlorohydrin are introduced into and admixed in a reaction vessel. The aqueous alkali serves to dissolve the Bisphenol A with the formation of the alkali salts thereof. The aqueous alkali and Bisphenol A may be admixed and epichlorohydrin added thereto, or an aqueous solution of alkali and Bisphenol A may be added to the epichlorohydrin. The resulting mixture is heated to a temperature of about 80° C. to 110° C. for a period of time varying from about one-half hour to three hours, or more, depending upon the quantities of reactants used.

Upon completion of heating, the reaction mixture separates into layers. The upper aqueous layer is withdrawn and discarded, and the lower layer is washed with hot water to remove unreacted alkali and halogen salt, in this case, sodium chloride. The cured glycidyl ethers or epoxy resins of this invention are especially useful for electrical applications. For example, a mixture of glycidyl polyethers and curing catalysts may be applied to electrical wires, cables, coils, and the like as part of impregnating and coating varnishes. The catalyzed glycidyl polyether compositions also may be employed for potting and casting applications. Other types of electrical equipments such as transformers, rectifiers and electronic components of various kinds can be potted or cast within the completely cured glycidyl polyether c omposition of this invention. In addition the epoxy resins and the curing catalysts of this invention are excellent adhesives. Coatings may be applied to porcelain, paper, wood, metal and plastics and when the coated surfaces are superposed and subjected to moderate pressures and heated to temperatures of about 100° C. to 200° C. unusually good bond is obtained.

The cured polyurethane polymers of this invention are useful for many varied applications. They are particularly useful for potting and encapsulation of electronic equipment, and for many machine parts. Products which can be prepared from the cured polyurethane polymers of this invention are solid tires, mechanical tools, molded, lathe cut, cast or dipped, such as ceiling rings, channel rubbers, packing gaskets, mountings, mattings, tile, footwear heels, tractor cleats, etc. In addition, these products form valuable films in the form of sheeting, wrapping film, etc. In addition, cellular products useful vibration dampers, etc. which can be expanded with a blowing agent or which are self-blown can also be prepared by the process of this invention.

The following examples illustrate various embodiments of this invention and are to be considered not limitative.

*Example 1*

A total of 100 grams of a fluid isocyanate-terminated polyurethane polymer (prepolpmer A) prepared from a polyetetramethylene glycol having a number average molecular weight of 1700 and 2,4-tolylene diisocyanate was heated to 115° C. and then maintained at 115° C. under reduced pressure for sufficient time (about 3 minutes) to remove entrapped gases. Prepolymer A had an average molecular weight of about 1800, a specific gravity of 1.06, a viscosity at 86° F. of about 16,000 cps., and contained about 4.2 percent free isocyanate groups by weight. To the degassed quantity of prepolymer A 9.4 grams of lauroguanamine which had previously been melted by heating to 115° C. was added with mixing. After the resulting solution had been degassed under a pressure of about 10 mm. Hg for about 1.5 minutes it was cast into sheets between release-coated glass plates (0.07 inch apart). The sheets were cured for about 22 hours at 100° C. in an air-circulating oven, and then allowed to stand at room temperature for seven days. The following physical properties were measured on the flexible, clear, elastic sheets obtained:

cured polymer of Example II a total of 75 percent by weight was derived from the polyol employed and in Example III the figure was 74.8 percent.

*Examples IV—VII*

Four additional experiments were performed in which sheets of cured polyurethane polymer compositions were prepared from portions of degassed prepolymer A using the same procedure as described in Example I. In Examples IV and V the curing agent employed was oleoguanamine, while in Example VI and VII the curing agent was stearoguanamine. Pertinent details relating to these experiments are given in Table 1 which follows:

TABLE 1.—Cured polyurethane polymers from adiprene L-100

| Ex. | Formulation | | | Curing Conditions | | Physical Properties | | | | |
|---|---|---|---|---|---|---|---|---|---|---|
| | Prepolymer A (grams) | Oleoguanamine (grams) | Stearoguanamine (grams) | Time | Temperature (° C.) | Tensile Strength (p.s.i.) | Elongation (percent) | Tear Strength (lbs./in.) | Shore A Hardness | Shore D Hardness |
| IV | 100 | 14.1 | | About 22 hours | 100 | [1] 1,720 | 450 | 270 | 68 | |
| V | 100 | 14.1 | | do | 100 | [1] 1,680 | 500 | | 64 | |
| VI | 100 | | 16.05 | do | 100 | [2] 3,870 | 565 | 295 | 77 | 35 |
| VII | 100 | | 16.05 | do | 100 | [2] 6,000 | 575 | | 75 | |

[1] In these two examples the molar ratio of the —NCO groups/—OH groups plus—NH₂ groups was 1.66:1. In the cured polymers of these two examples a total of 72.3 percent by weight was derived from the glycol employed in forming the prepolymer.
[2] In Examples VI and VII the molar ratio of the —NCO groups/—OH groups plus —NH₂ groups was 1.87:1. In the cured polymer by weight 71.0 percent was derived from the glycol.

Tensile strength at break, p.s.i. _____ 2535
Elongation at break, percent _____ 600
Tear strength, lbs./in. _____ 315
Shore A hardness _____ 79
Shore D hardness _____ 35

The molar ratio of the —NCO groups/—OH groups plus —NH₂ groups was 2:1. In the cured polymer a total of 76 percent by weight was derived from the glycol.

*Examples II–III*

In these examples the procedure of Example I was utilized in preparing cured polyurethane sheets from the isocyanate-terminated polyurethane prepolymer employed in Example I. In Example II, 100 parts by weight of prepolymer A was heated at 115° C. under reduced pressure to remove entrapped gas. In the next step 10.6 grams of molten lauroguanamine was added to the degassed quantity of prepolymer A and the resulting solution was heated at reduced pressure with stirring at a temperature of about 115° C. to remove any entrapped gases and then cast into sheets between coated glass plates 0.07 in. apart. The product was cured for about 22 hours at 100° C. and then allowed to stand at room temperature for 7 days. Clear, flexible, plastic sheets were obtained.

In Example III, 10.9 grams of molten lauroguanamine was added with stirring to 100 grams of degassed Prepolymer A and the resulting solution was heated under a pressure of about 10 mm. Hg for about one minute to remove entrapped gases. Sheets were then formed and cured in the same manner as described in Example II. Clear, flexible elastic sheets resulted.

The physical properties of the products of Examples II and III were determined and are given below:

| Example | II | III |
|---|---|---|
| Tensile strength at break, p.s.i. | 1,610 | 3,100 |
| Elongation at break, percent | 500 | 575 |
| Tear strength, lbs./in. | 210 | 250 |
| Shore A hardness | 69 | 79 |
| Shore D hardness | 25 | |
| Torsional modulus, p.s.i.: | | |
| At −54 °C | | 2.57×10³ |
| At −55° C | | 2.92×10³ |

In Examples II and III the molar ratio of the —NCO groups/—OH groups plus —NH₂ groups was 1.85. In the

*Example VIII*

To 100 grams of polypropylene glycol (number average molecular weight 1000) which had been dehydrated at 110°–120° C. under reduced pressure (0.3 to 0.5 mm. Hg) there was added at room temperature with stirring 0.03 gram of benzoyl chloride. In the next step 29.26 grams of a mixture of diisocyanates containing 80 percent by weight of 2,4-tolylene diisocyanate and 20 percent by weight of 2,6-tolylene diisocyanate was added slowly under a nitrogen atmosphere and with stirring. The benzoyl chloride served to prevent side reactions and to induce the formation of a linear polymer. The reaction mixture was then heated to 80° C., maintained at that temperature 1.0 hour and then cooled slowly to room temperature. The polymer was heated for 3 hours at 120° C. and at 0.05 mm. Hg to remove unreacted diisocyanate. After 24 hours storage the free NCO content of the resulting urethane prepolymer (prepolymer B) was determined by analysis and found to be 3.93.

To 100 grams of prepolymer B there was added 7.94 grams of lauroguanamine and the mixture was heated to 115° C. with stirring. While being maintained at 115° C. the solution was degassed under a reduced pressure of about 10 mm. Hg. The resulting polyurethane composition was cast into sheets between release-coated glass plates (0.07 in. apart) and cured in an air circulating oven at 100° C. for about 22 hours. The sheets exhibited the following properties when tested after being allowed to stand at room temperature for seven days.

Tensile strength at break, p.s.i. _____ 1720
Elongation at break, percent _____ 730
Tear strength, lbs./in. _____ 150
Shore A hardness _____ 72
Shore D hardness _____ 29

The molar ratio of the —NCO groups/—OH groups plus —NH₂ groups was 1.15:1 and in the cured polymer a total of 73.7 percent by weight was derived from the glycol.

*Example IX*

In this example a polyurethane composition was prepared from 100 grams of prepolymer B (see Example VIII for description of this material) and 6.4 grams of lauroguanamine in the same manner as described in Example VIII. The resulting polyurethane composition was cast into sheets between release-coated glass plates (0.07 in. apart) and cured for about 22 hours at 100° C. in an air circulating oven. After the product had been allowed to stand at room temperature for seven days, the following physical properties were measured:

Tensile strength at break, p.s.i _____ 1200
Elongation at break, percent _____ 1075
Tear strength, lbs./in. _____ 110
Shore A hardness _____ 67
Shore D hardness _____ 26

In this example the molar ratio of the —NCO groups/—OH groups plus —NH$_2$ groups was 1.47:1. A total of 81.2 percent by weight of the cured polymer was derived from the glycol.

*Example X*

To 100 grams of polypropylene glycol (number average molecular weight 1000) which had been dehydrated for about 1 hour at 110°–120° C. under reduced pressure 0.3 to 0.5 mm. Hg and 4.1 grams of 1,1,1-trimethylolpropane there was added with stirring 0.03 gram of benzyl chloride. In the next step 37.1 grams of a mixture of diisocyanates containing 80 percent by weight of 2,4-tolylene diisocyanate and 20 percent by weight of 2,6-tolylene diisocyanate was slowly added under a nitrogen atmosphere and with agitation. The reaction mixture was heated to 80° C., maintained at that temperature for 1.0 hour and then cooled slowly to room temperature. The polymer was heated for 3 hours at 120° C. and at 0.05 mm. Hg to remove unreacted diisocyanate. After 24 hours storage the free NCO content of the resulting isocyanate-terminated polyurethane prepolymer (prepolymer C) was determined by analysis and found to be 3.56 percent.

To 100 grams of prepolymer C, 11.05 grams of lauroguanamine was added at room temperature with stirring. The mixture was then heated to 115° C. and the resulting solution was degassed at a pressure of about 10 mm. Hg and then cast into sheets between release-coated glass plates (0.07 in. apart) and then cured in an air circulating oven at 100° C. for about 22 hours. Physical properties of the clear, elastic, flexible sheets obtained were measured after the sheets had been allowed to stand at room temperature for seven days. The following values were obtained:

Tensile strength at break, p.s.i. _____ 870
Elongation at break, percent _____ 170
Tear strength, lbs./in. _____ 8
Shore A hardness _____ 80
Shore D hardness _____ 40

The molar ratio of —NCO groups/—OH groups and —NH$_2$ groups was 0.99:1. A total of 63.3 percent by weight of the cured polymer was derived from the glycol, the 1,2,6-hexane triol and the 1,1,1-trimethylolpropane.

*Example XI*

In this example an isocyanate-terminated polyurethane prepolymer was prepared using a mixture of tolylene diisocyanate isomers, a polypropylene glycol of number average molecular weight 1000 and a polyether tetrol (prepared from propylene oxide and pentaerythritol) having a number average molecular weight of 500, a hydroxyl number of 448, and a viscosity of 1472 cps. at 25° C.

To 100 grams of polypropylene glycol (number average molecular weight 1000) which had been dehydrated at 110°–120° C. under reduced pressure (0.3 to 0.5 mm. Hg) and 7.5 grams of the above-mentioned polyether tetrol there was added with stirring at room temperature 0.03 gram of benzoyl chloride. Under nitrogen 35.7 grams of a mixture of diisocyanates containing 80 percent by weight of 2,4-tolylene diisocyanate and 20 percent 2,6-tolylene diisocyanate was slowly added. The reaction mixture was heated to 80° C., maintained at that temperature for 1.0 hour and then slowly cooled to room temperature. Unreacted diisocyanate was then removed by heating for 3 hours at 120° C. and at 0.05 mm. Hg. The free NCO content of the resulting isocyanate-terminated polyurethane prepolymer (prepolymer D) was determined by analysis after the product had been stored at room temperature for 24 hours and found to be 4.3 percent.

From 100 grams of prepolymer D and 11.5 grams of lauroguanamine, sheets were prepared and cured in the same manner as described in Example X. Physical properties of the clear, elastic, flexible sheets obtained were determined after the sheets had been allowed to stand for seven days. The results were as follows:

Tensile strength at break, p.s.i. _____ 970
Elongation at break, percent _____ 225
Tear strength, lbs./in. _____ 15.5
Shore A hardness _____ 79
Shore D hardness _____ 40

The molar ratio of the —NCO groups/—OH groups plus —NH$_2$ groups was 1.17:1. In the cured polymer 69.5 percent by weight was derived from the glycol and the tetrol employed.

*Example XII*

To 100 grams of a polypropylene glycol (number average molecular weight 1000) which had been previously dehydrated by heating for about 1 hour at a temperature of 110°–120° C. and at a pressure of 0.3–0.5 mm. Hg, there was added at a temperature of 110° C. a total of 9.0 grams of lauroguanamine with stirring. The reaction mixture was then allowed to cool to 35° C. with stirring and at a pressure of about 10 mm. Hg after which 29.0 grams of a mixture of tolylene diisocyanate isomers containing 80 percent by weight of 2,4-tolylene diisocyanate and 20 percent by weight of 2,6-tolylene diisocyanate was added slowly. The coludy mixture which resulted was then heated with agitation at a pressure of about 10 mm. Hg to 150° C. and the temperature maintained at that temperature and pressure until a clear solution was obtained (about 20 minutes). In the next step the clear solution was cast between release-coated glass plates maintained at 0.07 in. apart and cured for about 22 hours at 100° C.

Physical properties of the resulting flexible, clear, elastic sheets were measured after the products had been allowed to remain at room temperature for seven days. The following results were obtained:

Tensile strength at break, p.s.i. _____ 585
Elongation at break, percent _____ 600
Tear strength, lbs./in. _____ 125
Shore A hardness _____ 72
Shore D hardness _____ 35

The molar ratio of the —NCO groups/—OH groups plus —NH$_2$ groups was 1.16:1. A total of 72 percent of the cured polymer by weight was derived from the glycol.

*Examples XIII–XIV*

In these examples polyurethane polymers were prepared in the same manner as described in Example XII. Sheets were cast from these polymers and cured as described in Example XII.

In Example XIII the polyurethane polymer was prepared from 100 grams of a polypropylene glycol (number average molecular weight 2000), 9.0 grams of lauroguanamine, and 20.15 grams of a mixture containing 80 percent by weight of 2,4-tolylene diisocyanate and 2,6-tolylene diisocyanate while in Example XIV the ingredients were 100 grams of a polypropylene glycol (number average molecular weight 1000), 9.8 grams of lauroguanamine and 25.5 grams of the same diisocyanate mixture.

In both instances clear, elastic, flexible sheets were obtained which were tested after remaining for seven days at room temperature and the following results were obtained:

| | Product of Example XIII | Product of Example XIV |
|---|---|---|
| Tensile strength at break, p.s.i. | 545 | 1,300 |
| Elongation at break, percent | 250 | 700 |
| Tear strength, lbs./in. | 120 | 120 |
| Shore A hardness | 65 | 62 |
| Shore D hardness | 28 | 30 |

The molar ratio of the —NCO groups/—OH groups plus —NH$_2$ groups was 1.30:1 in Example XIII, and 1.0:1 in Example XIV. In Example XIII a total of 77.4 percent by weight of the cured polymer was derived from the glycol; in Example XIV the figure was 74 percent.

*Example XV*

A total of 9.8 grams of lauroguanamine was added with stirring to a mixture of 100 grams of a polypropylene glycol (number average molecular weight 1000) and 4.02 grams of 1,2,6-hexane triol maintained at a temperature of 110° C. The polypropylene glycol employed had been previously dehydrated by heating for about 1 hour at a temperature of 110°–120° C. and at a pressure of 0.3–0.5 mm. Hg. The reaction mixture was then allowed to cool to 35° C. with stirring and at a pressure of about 10 mm. Hg after which 42.7 grams of a mixture of tolylene diisocyanate isomers containing 80 percent by weight of 2,4-tolylene diisocyanate and 20 percent by weight of 2,6-tolylene diisocyanate was slowly added. A cloudy mixture resulted which was then heated to 150° C. with agitation and at a pressure of about 10 mm. Hg and then maintained under these conditions until a clear solution was obtained.

Sheets of the polyurethane polymer were prepared, cured and tested as described in Example XIII. The following results were obtained:

Tensile strength at break, p.s.i. _____ 860
Elongation at break, percent _____ 85
Tear strength, lbs./in. _____ 4
Shore A hardness _____ 80
Shore D hardness _____ 43

In this example the molar ratio of the —NCO groups/—OH groups plus —NH$_2$ groups was 1.05. In the cured polymer a total of 66.4 percent by weight was derived from the diol and the triol.

*Examples XVI–XVII*

Two additional urethane polymers were prepared, cured and tested in the same manner as set forth in Example XIV. In both of these examples a mixture of polyols was employed. The formulations and the results obtained on testing the clear, elastic, flexible sheets prepared are set forth below:

| Formulation | Example XVI (grams) | Example XVII (grams) |
|---|---|---|
| Polypropylene glycol [1] | 100 | 100 |
| 1,1,1-trimethylolpropane | 4.02 | |
| Polyether tetrol [2] | | 8.25 |
| Tolylene diisocyanate [3] | 42.7 | 40.0 |
| Lauroguanamine | 9.8 | 9.8 |

[1] Number average molecular weight 1,000.
[2] A material prepared by reacting propylene oxide and pentaerythritol having a number average molecular weight of 500, a hydroxyl number of 448, and a viscosity of 1,472 cps. at 25° C.
[3] A mixture containing 80 percent by weight of 2,4-tolylene diisocyanate and 20 percent by weight of 2,6-tolylene diisocyanate.

| | Example XVI | Example XVII |
|---|---|---|
| Test Results: | | |
| Tensile strength at break, p.s.i. | 605 | 365 |
| Elongation at break, percent | 200 | 150 |
| Tear strength, lb./in. | 14 | 0 |
| Shore A hardness | 79 | 75 |
| Shore D hardness | 38 | 40 |

The molar ratio of the —NCO groups/—OH groups plus —NH$_2$ groups in Example XVI was 1.05:1, in Example XVII it was 1.07. In the cured polymer of Example XVI the percent by weight derived from the glycol and 1,1,1-trimethylolpropane was 66.4 while in Example XVII a total of 68.5 percent by weight was derived from the glycol and the tetrol.

*Example XVIII*

In this example a hydroxyl-terminated polyester prepared from adipic acid and a polyether polyol having a hydroxyl number of about 165, a viscosity of 160–240 cps. at 20° C. (70 percent solution) and an equivalent weight of 337 was employed. To 100 grams of the above-mentioned polyester which had been dehydrated by heating for about 1 hour at 110° C. and at a pressure of 0.3 to 0.5 mm. Hg heated to 115° C. was added 29.0 grams of lauroguanamine. Then 51.6 grams of a mixture of tolylene diisocyanates containing 80 percent by weight of 2,4-tolylene diisocyanate and 20 percent by weight of 2,6-tolylene diisocyanate was added and the resulting solution degassed at 115° C. at a pressure of 10 mm. Hg. The polyester-type polyurethane polymer was pressed on a plate (compression sheet) to form a sheet of about 0.1 inch thickness, which was cured for 16 hours at 100° C. in an air circulating oven. The physical properties of the resulting opaque, elastic, flexible sheet were measured and the following results were obtained:

Tensile strength at break, p.s.i. _____ 2500
Elongation at break, percent _____ 70
Tear strength, lbs./in. _____ 1200

In this example the molar ratio of —NCO groups/—OH groups plus —NH$_2$ groups was 0.95:1. A total of 55.3 percent by weight of the cured polymer was derived from the polyester.

*Example XIX*

A total of 67.9 grams of lauroguanamine was melted and poured, with mixing, into 100 grams of diglycidyl ether of Bisphenol A having a molecular weight of about 380, a specific gravity at 25° C. of about 1.16, and an epoxide equivalent of about 190 to form a slurry which was then heated to 130° C. yielding a clear melt. Sheets were prepared by casting the clear material between glass plates maintained at 0.07 inch apart. The sheets, after being cured by heating in an air-circulating oven for 4 hours at 100° C. and then at 140° C. for an additional 4 hours, were allowed to stand at room temperature for seven days. On testing of the clear, elastic sheets obtained the following results were obtained:

Tensile strength at break, p.s.i. _____ 8000
Shore A hardness _____ 81

The value of the molar ratio of —OH groups/—NH$_2$ groups was 1:1. The epoxy units comprised about 59.5 percent by weight of the cured resin.

*Example XX*

Using the same procedure set forth in Example XVIII cured sheets were prepared from 34 grams of lauroguanamine and 100 grams of the same epoxy resin utilized in Example XIX. The following physical properties were measured after the clear, elastic, flexible cured sheets had been allowed to stand for 7 days at room temperature:

Tensile strength at break, p.s.i. _____ {10,600 / 10,700}

Shore D hardness _____ 79

The value of the molar ratio of —OH groups/—NH₂ groups was 1:1. In this example the epoxy units comprised about 73 percent by weight of the cured epoxy resin.

*Example XXI*

A total of 84 grams of a polypropylene ether triol having a number average molecular weight of 3000 was mixed under argon with stirring at room temperature with 16 grams of a polypropylene ether triol of number average molecular weight 400. To the mixed triols there was added under argon with stirring 25.8 grams of 2,4-tolylene diisocyanate and the resulting mixture was heated to 80° C. and held at that temperature for 90 minutes. The resulting isocyanate-terminated polyurethane prepolymer was allowed to cool and analyzed to determine the total NCO content. Based on the NCO content the molecular weight was calculated to be 2000.

A total of 20.0 grams of lauroguanamine was melted and then added with mixing to 100 grams of the prepolymer previously prepared which had been heated to 115° C. The resulting solution was degassed at about 115° C. for about 30 seconds; then cast into sheets between release-coated glass plates (0.04 inch apart) and the sheets cured for 18 hours at 100° C. After the clear, colorless, flexible sheets thus formed had been allowed to stand in a desiccator under vacuum for seven days and after being maintained for seven additional days at 72° F. and at 50 percent relative humidity, the following physical properties were measured:

Tensile strength at break, p.s.i. _____ 1710
Elongation at break, percent _____ 225
Tear strength, lbs./in. _____ 895
Modulus, p.s.i.:
    100 percent elongation _____ 920
    200 percent elongation _____ 1490
Shore A hardness _____ 85

The molar ratio of the —NCO groups/—OH groups plus —NH₂ groups was 1:1. In this cured polyurethane polymer 66.5 percent by weight was derived from the triols employed.

*Example XXII*

In this example an isocyanate-terminated polyurethane prepolymer was prepared from 76 grams of a polypropylene ether triol of number average molecular weight 3000, 24 grams of a polypropylene ether triol of number average molecular weight 400 and 30.6 grams of 2,4-tolylene diisocyanate in the manner set forth in Example XXI. The —NCO content of the resulting prepolymer was 7.45 percent and the calculated molecular weight was 1700.

Lauroguanamine (23.5 grams) was melted and then added with mixing to 100 grams of the prepolymer which had been heated to about 115° C. The resulting solution was degassed at 115° C. for about 30 seconds, then cast into sheets between release-coated glass plates (0.04 inch apart) and the polymeric material cured for about 18 hours at 100° C. The clear, colorless, flexible sheets resulting were, after standing in a vacuum desiccator for seven days and after being maintained for an additional period of seven days at 72° F. and 50 percent relative humidity, were tested and the following results were obtained:

Tensile strength at break, p.s.i. _____ 2700
Elongation at break, percent _____ 150
Tear strength, lbs./in. _____ 1200
Modulus, p.s.i.:
    100 percent elongation _____ 1830
Shore A hardness _____ 90

The molar ratio of the —NCO groups/—OH groups plus —NH₂ groups was 1:1. A total of 62.3 percent by weight of this cured polymer was derived from the triols used.

*Example XXIII*

From 100 grams of a polytetramethylene glycol, having an average molecular weight of 1770, 19.7 grams of 2,4-tolylene diisocyanate and 11.6 grams of lauroguanamine clear, elastic, flexible sheets were prepared and cured in the same manner as set forth in Example XXI. The prepolymer had an NCO content of 3.65 percent and an average molecular weight of 2300.

The cured sheets, after being allowed to stand in a vacuum desiccator for 7 days and after being maintained for an additional period of seven days at 72° F. and 50 percent relative humidity, were tested and the following results were obtained:

Tensile strength at break, p.s.i. _____ 2470
Modulus, p.s.i.:
    100 percent elongation _____ 410
    200 percent elongation _____ 520
Shore A hardness _____ 80

In the cured polymer 75 percent by weight was derived from the glycol used. The molar ratio of the —NCO groups/—OH groups plus —NH₂ groups was 1:1.

*Example XXIV*

From a total of 100 grams of polyethylene adipate having a number average molecular weight of 1500, 23.2 grams of 2,4-tolylene diisocyanate and 14.2 grams of lauroguanamine, sheets were prepared and cured as described in Example XXI. Clear, flexible, elastic materials were obtained. The average molecular weight of the prepolymer was calculated to be 1870 and the NCO content was found to be 4.5 percent.

The molar ratio of the —NCO groups/—OH groups plus —NH₂ groups was 1:1. A total of 71.5 percent of the weight of the cured polymer was derived from the polyethylene adipate.

*Examples XXV–XXVIII*

In these examples cured polyurethane polymer sheets were prepared from a polypropylene glycol, 2,4-tolylene diisocyanate and lauroguanamine in the same manner as set forth in Example XXI. In Example XXV 100 grams of a polypropylene glycol of number average molecular weight 800, 43.5 grams of 2,4-tolylene diisocyanate and 22.8 grams of lauroguanamine were used; in Example XXVI 100 grams of a polypropylene glycol of number average molecular weight 1000, 34.8 grams of 2,4-tolylene diisocyanate and 18.8 grams of lauroguanamine were utilized; in Example XXVII the ingredients were 100 grams of a polypropylene glycol of number average molecular weight of 1300, 26.8 grams of 2,4-tolylene diisocyanate and 16.3 grams of lauroguanamine while in Example XXVIII 100 grams of a polypropylene glycol having an average molecular weight of 1500, 23.2 grams of 2,4-tolylene diisocyanate and 14.3 grams of lauroguanamine were utilized. In each example 100 grams of the respective prepolymer was cast into sheets and cured in the manner described in Example XXI. The clear, flexible, elastic sheets thus formed were tested and the following results were obtained:

| Product of Example | XXV | XXVI | XXVII | XXVIII |
| --- | --- | --- | --- | --- |
| Tensile strength at break, p.s.i. | 1,190 | 680 | 255 | 122 |
| Elongation at break, percent | 500 | 710 | 525 | 350 |
| Modulus, p.s.i.: | | | | |
| 100 percent elongation | 750 | 480 | 190 | 110 |
| 200 percent elongation | 900 | 600 | 240 | 120 |
| Shore A hardness | 82 | 80 | 73 | 70 |

The NCO (percent) of the prepolymers of these examples (value A); the average molecular weight of the prepolymers (value B); the percent by weight of the final cured polyurethane polymer derived from the glycol (value C) and the molar ratio of —NCO groups/—OH groups plus —NH$_2$ groups was as follows (value D):

| Example | XXV | XXVI | XXVII | XXVIII |
|---|---|---|---|---|
| Value: | | | | |
| A | 7.15 | 5.95 | 5.16 | 4.52 |
| B | 1,170 | 1,410 | 1,630 | 1,860 |
| C | 57.0 | 62.5 | 68.0 | 71.0 |
| D | 1:1 | 1:1 | 1:1 | 1:1 |

*Example XXIX*

An isocyanate-terminated polyurethane prepolymer was prepared by adding under argon 2 moles (336 grams) of hexamethylene diisocyanate to 1 mole (800 grams) of a polypropylene glycol having a number of average molecular weight of 800 with stirring. The resulting mixture was heated to 80° C. and held at that temperature for 90 minutes. The NCO content (percent) was measured and found to be 6.83 and the average molecular weight was calculated to be 1230.

A total of 10.9 grams of lauroguanamine was melted and added along with 3.6 grams of trimethylolpropane with mixing to 100 grams of the previously prepared prepolymer which had been heated to a temperature of 115° C. The resulting solution was degassed at 115° C. for about 30 seconds at about 3 mm. Hg pressure then cast into sheets between glass plates maintained at 0.04 inch apart, and finally cured for 18 hours at 100° C. Cloudy, translucent, flexible sheets were obtained.

By weigh, 62.5 percent of the cured polyurethane polymer was derived from the glycol employed. The molar ratio of —NCO groups/—OH groups plus —NH$_2$ groups was 1:1.

*Example XXX*

In this example sheets of cured polyurethane polymer were prepared from 2 moles (336 grams) of hexamethylene diisocyanate, 1 mole (800 grams) of a polypropylene glycol having a number average molecular weight of 800, 15.3 grams of lauroguanamine and 1.8 grams of trimethylolpropane in the same manner as described in Example XIX. The prepolymer prepared had a —NCO content (percent of 6.83 and the average molecular weight was 1230.

The cloudy, translucent, flexible sheets thus prepared were maintained in a vacuum desiccator for seven days, held for seven additional days at 72° F. at 50 percent relative humidity and then tested. The following values were obtained:

Tensile strength at break, p.s.i. _____ 820
Elongation at break, percent _____ 200
Modulus, p.s.i. _____ 100
 100 percent elongation _____ 730
Shore A hardness _____ 87

The percent by weight of the final curing polyurethane polymer derived from the glycol was 61. The molar ratio of the —NCO groups/—OH groups plus —NH$_2$ groups was 1:1.

*Example XXXI*

In this example an isocyanate-terminated polyurethane prepolymer was prepared from 136 grams of a polypropylene glycol having an average molecular weight of 2000, 64 grams of a polypropylene glycol having a number average molecular weight of 400 and 77 grams of 2,4-tolylene diisocyanate in the same manner as described in Example XXX. The NCO content (percent) of the prepolymer was 6.55 and the number average molecular weight was 1280.

Cured, polyurethane polymer sheets were prepared from 100 grams of the prepolymer prepared as described above, 18.6 grams of lauroguanamine and 0.7 gram of trimethylolpropane in the same manner as described in Example XXIX. The colorless, clear, flexible sheets thus obtained were tested and the following values were obtained:

Tensile strength at break, p.s.i. _____ 1880
Elongation at break, percent _____ 625
Modulus, p.s.i.:
 100 percent elongation _____ 610
 200 percent elongation _____ 810
Shore A hardness _____ 87

In the cured polyurethane polymer prepared in this example 60.5 percent by weight was derived from the polypropylene glycols. The molar ratio of the —NCO groups/—OH groups plus —NH$_2$ groups was 1:1.

*Examples XXXII–XXXIII*

In these two examples a polyurethane prepolymer prepared as described in Example XXXI was employed. In Example XXXII from 100 grams of the prepolymer, 14.5 grams of lauroguanamine, and 2.1 grams of trimethylolpropane sheets were prepared, cured and tested as in Example XXX while in Example XXXII, sheets were prepared, cured and tested in a like manner from 100 grams of the prepolymer and 20.8 grams of lauroguanamine.

The physical properties of the resulting, clear, colorless, flexible sheets produced were as follows:

| Cured Polymer of | Example XXXII | Example XXXIII |
|---|---|---|
| Tensile strength at break, p.s.i. | 1,970 | 2,020 |
| Elongation at break, percent | 500 | 510 |
| Modulus, p.s.i.: | | |
| 100 percent elongation | 460 | 675 |
| 200 percent elongation | 700 | 890 |
| Shore A hardness | 81 | 87 |

In both of these examples the value molar ratio of —NCO groups/—OH groups plus —NH$_2$ groups was 1:1. The percent by weight of the cured polymer derived from the glycols was 61.7 in Example XXXII and 59.6 in Example XXXIII.

*Example XXXIV*

A polyurethane prepolymer was prepared by mixing together at room temperature under argon 136 grams of a polypropylene glycol having a number average molecular weight of 4000, 64 grams of a polypropylene glycol of a number average molecular weight of 4000, heating the thus-prepared mixture to 80° C. and then continuing the heating at that temperature for 90 minutes.

To a total of 30 grams of the above-described prepolymer at 115° C. there was added with stirring 6.25 grams of molten lauroguanamine and the resulting solution heated at that temperature under a pressure of 3 mm. Hg for about 30 seconds to remove entrapped gases. The clear solution was then cast into sheets between release-coated glass plates (0.040 inch apart) and cured at 100° C. in an air circulating oven at 20 hours. The clear, elastic, sheets were placed in a vacuum desiccator for seven days and then maintained at 72° F. at 50 percent relative humidity for an additional period of seven days. On testing the following values were obtained:

Tensile strength at break, p.s.i. _____ 2000
Elongation at break, percent _____ 510
Modulus, p.s.i.:
 100 percent elongation _____ 670
 200 percent elongation _____ 890
 300 percent elongation _____ 1060
Shore A hardness _____ 87

The remaining portion of the previously prepared prepolymer was allowed to stand in a glass container under argon at room temperature for one month. Then the prepolymer was dissolved in tetrahydrofuran at about 70° C. to form a solution containing about 10 percent by weight of the prepolymer. Sheets were prepared by casting the solution on a release-coated glass plate, allowing the solvent to evaporate for about 18 hours and finally curing in an air circulating oven at 100° C. for 4 hours. The clear, elastic sheets thus-obtained were tested and the following results were obtained:

| | |
|---|---|
| Tensile strength at break, p.s.i. | 850 |
| Elongation at break, percent | 520 |
| Modulus, p.s.i.: | |
| 100 percent elongation | 520 |
| 200 percent elongation | 650 |
| 300 percent elongation | 700 |

The molar ratio of the —NCO groups/—OH groups plus —NH$_2$ groups was 1:1. A total of 59.6 percent by weight of the final cured polymer (both products).

This example illustrates that a mixture of a polyurethane prepolymer and a guanamine curing agent of this invention is stable for an extended period of time and at the end of such storage period, the mixture can then be cured to form a polyurethane product having desirable physical properties.

What is claimed is:

1. A polyurethane polymer prepared by reacting (1) an organic polyisocyanate, (2) a material selected from the group consisting of a polyether polyol having a number average molecular weight between about 400 and 10,000 and a hydroxyl-terminated polyester having a molecular weight of between 500 and 5000, and (3) a guanamine selected from the group consisting of caproguanamine, pelargonoguanamine, lauroguanamine, stearoguanamine, oleoguanamine and 2 - ethylhexanoquanamine; there being about 0.75 to 1.1 —NCO groups for each —OH group and about 0.5 to 1.1 —NCO group for each —NH$_2$ group; with about 50 to about 85 percent by weight of the said polyurethane polymer being derived from said material (2) and about 4 to about 40 percent by weight of said polyurethane polymer being derived from said guanamine compound.

2. The polyurethane polymer of claim 1 where the said material is a polyether polyol.

3. The polyurethane polymer of claim 1 in which the organic polyisocyanate is 2,4-tolylene diisocyanate.

4. The polyurethane polymer of claim 1 in which the said guanamine compound is lauroguanamine.

5. The polyurethane polymer of claim 1 in which the said guanamine compound is oleoguanamine.

6. The polyurethane polymer of claim 1 wherein the said guanamine compound is stearoguanamine.

7. The polyurethane polymer of claim 1 wherein the said material is a polyester.

8. The polyurethane polymer of claim 7 in which the said polyester is a polyethylene adipate of molecular weight 1500.

References Cited

UNITED STATES PATENTS

| | | | |
|---|---|---|---|
| 3,087,912 | 4/1963 | Wagner et al. | 260—67 |
| 3,097,192 | 7/1963 | Schilit | 260—75 |
| 3,105,062 | 9/1963 | Graham et al. | 260—75 |
| 3,188,302 | 6/1965 | Lorenz | 260—77.5 |
| 3,194,793 | 7/1965 | Kogon | 260—77.5 |
| 3,214,324 | 10/1965 | Peerman | 260—47 |
| 3,214,403 | 10/1965 | Peerman | 260—37 |
| 3,214,409 | 10/1965 | Peerman | 260—59 |
| 3,225,004 | 12/1965 | Peerman | 260—49 |
| 3,242,131 | 3/1966 | Peerman | 260—37 |
| 3,267,172 | 8/1966 | Arnold | 260—830 |

FOREIGN PATENTS

| | | |
|---|---|---|
| 1,154,937 | 9/1963 | Germany. |
| 6,411,810 | 4/1965 | Netherlands. |

DONALD E. CZAJA, *Primary Examiner.*

LEON J. BERCOVITZ, *Examiner.*

F. McKELVEY, *Assistant Examiner.*